Sept. 4, 1923.

C. J. KERR

AUTOMOBILE REFRIGERATOR

Filed Oct. 24, 1921

INVENTOR
Charles J. Kerr
BY
Pierre Barnes
ATTORNEY

Patented Sept. 4, 1923.

1,466,906

UNITED STATES PATENT OFFICE.

CHARLES J. KERR, OF SEATTLE, WASHINGTON.

AUTOMOBILE REFRIGERATOR.

Application filed October 24, 1921. Serial No. 509,895.

*To all whom it may concern:*

Be it known that I, CHARLES J. KERR, a citizen of the United States, residing at Seattle, in the county of King and State of Washington, have invented certain new and useful Improvements in Automobile Refrigerators, of which the following is a specification.

This invention relates to automobile refrigerators. Its object is the provision of a simple, inexpensively constructed and efficient refrigerator of this character which is capable of economically retaining beverages and commestibles in a cool condition.

A further object of the invention is the provision of an automobile refrigerator which is adapted and arranged on the vehicle to utilize the effect of air currents for cooling the refrigerator when the vehicle is traveling and with a lessening in the consumption of ice when the latter is employed in hot weather.

Other objects and advantages of the invention will appear in the following description.

The invention consists in the novel construction and combination of parts hereinafter described and claimed.

In the accompanying drawings,—

Figure 1 is a plan with parts broken away of devices embodying the present invention applied to the front portion of an automobile. Figs. 2 and 3 are sectional views taken substantially through 2—2 and 3—3 of Fig 1.

In said drawings, the reference numerals 5 represent side rails and 6 a transverse rail member of an automobile frame and upon which is secured a water cooling radiator 7.

Secured to the frame rails 5 are bracket attachments 8 for a bumper 9.

The above referred to parts may be of any usual or suitable construction.

According to my invention 1 provide between the frame rails 5 two longitudinally disposed bars 10 each provided with a saddle like middle portion comprising a seat part 11 between two wall parts 12 and 13 and supported at its front and rear ends, respectively by the bumper 9 and the frame rail 6. As shown, the front of a bar is secured to said bumper by a bolt 14 and the rear end of the bar is formed with a rod extension 15 which extends through an aperture in the rail 6.

16 represent nuts taking on screw threads of the rod extensions 15 to the rear of rail 6 and between this rail and the adjacent walls 13 of said bars are provided helical springs 17 to accommodate rearward movements of the bumper with respect to the vehicle frame.

Supported upon the seat part 11 and between the walls 12 and 13 of said bars is a refrigerator or food receptacle of a substantially boxshape body 18 having a lid 19 connected thereto at the rear by hinges such as $19^1$.

Said body is formed with its bottom wall 20 inclined downwardly from the front toward the rear and is constructed with spaced inner and outer metal shell members 21 and 22 with a filler 23 of cork or equivalent material therebetween. As best shown in Fig. 3 the inner shell is doubled on itself at the top to afford an upwardly directed rim 24 and thence extends outwardly as a shelf 25 and terminates in a downwardly directed flange 26 outside of the outer shell 22. By thus constructing the inner shell, the same may be removed from the outer shell for replacing the filling 23 between the two shells.

The shell parts, moreover, are separably secured together by means of coupling bolts 27 having conical heads, as 28 Fig. 3, fitting into similarly shaped holes in the shelf part of the inner shell, and extending through the filler and outer shell to receive a winged nut 29 at the underside of the body. The lid 19 of the refrigerator is also formed hollow for the reception of a filler 30, as of cork, said lid being provided with a peripheral flange element 31 arranged to extend down over the shelf 25 of the body when the lid is in its closed position.

The exterior of the lid is protected from contact with the atmosphere by heat insulating material, such as wool felt indicated by 32, which is held in place by a covering 33 of canvas or other suitable flexible material.

Like the lid, the exterior surfaces of the front and side walls 35 and 34 are protected by a similar heat insulator—that is to say, wool felt $32^1$ confined by a covering $33^1$. The marginal edges of the covering of both the lid and body insulations are desirably turned in as at 36 to serve as a gasket to produce an air tight closure between the body and lid.

The bottom 20 and rear wall 38 of the body are unprovided with an external heat insulating means.

39 represents a baffle plate supported by the extensions 15 of the refrigerator supporting bars in juxtaposition to the frame rail 6. The lower portion 40 of said baffle plate is curved forwardly as shown in Fig. 2 to direct upwardly into the space between the radiator and the refrigerator, air currents which are diverged downwardly by the sloping under surface of the refrigerator. 41 represent screw bolts extending downwardly from reinforcing strips 42 secured to the underside of the refrigerator, said bolts passing through holes in the bar parts 11 to receive therebelow securing nuts 43 whereby the refrigerator is removably retained in place. Within the refrigerator compartment is provided one or more perforated shelves or floors, as 44 for sustaining food, etc. In the bottom of said compartment is provided a trapped drain pipe 45 through which is discharged water resulting from the melting of ice when the same is employed as a refrigerant within the refrigerator. The lid of the refrigerator is releasably held in its closed position by any suitable fastening devices as, for example, a strap 46 and bucket 47.

A motor vehicle in its forward travel creates a rearwardly directed draft or air current against the front end of the car and which is utilized for engine cooling purposes through the agency of the radiator.

By having the top, front and side walls of the refrigerator protected by the heat insulating jacket of wool, or the like, the air is prevented from impinging against such walls.

When the car is motionless, however, the top and three side walls of the refrigerator being protected by the above referred to insulating material is prevented from absorbing but a relatively small amount of heat from the external atmosphere heat whereby the function of the ice within the refrigerator is conserved. The cork packing, which is employed between the inner and outer shells of the refrigerator body and within the lid, moreover cooperates with the adjacent outer insulation to retard the passage of heat at such places, but at the bottom and back of the refrigerator, which is unprovided with an outside insulation, the cork appears to afford the proper amount of resistance to the passage of heat to maintain the interior of the receptacle at a substantially uniform temperature.

The manner of removably connecting the refrigerator to the vehicle is an important part of the invention. The manner of connecting the supporting bars 10 to the frame member 6 by means of a slidable joint and with the use of spring 17 enables the bumper to yield and obviates noise when traveling.

What I claim is,—

1. The combination with an automobile having a radiator, and a bumper connected to the automobile frame, of a receptacle having a sloping bottom which is inclined downwardly from the front toward the rear, bar supports for the receptacle, said supports being secured to said bumper and having slidable connections with the automobile frame below said radiator, springs urging said supports forwardly with respect to the automobile, and means for removably fastening the receptacle to the supports in spaced relations with respect to the radiator.

2. The combination with an automobile having a radiator, and a bumper connected to the automobile frame, of a receptacle, bar supports for the receptacle, said supports being secured to said bumper and having slidable connections with the automobile frame below said radiator, springs urging said supports forwardly with respect to the automobile, means for removably fastening said receptacle to the supports in spaced relations with respect to the radiator, and baffling means provided on the automobile frame adjacent to the bottom of the receptacle for directing air upwardly into the space between the latter and said radiator.

Signed at Seattle, Washington, this 13th day of October, 1921.

CHARLES J. KERR.

Witnesses:
PIERRE BARNES,
MARGARET G. SUPPLE.